3 Sheets--Sheet 1.
T. H. WILLSON & D. T. WILLSON.
Improvement in Machines for Cutting Hay.
No. 5,049. Reissued Sep. 10, 1872.
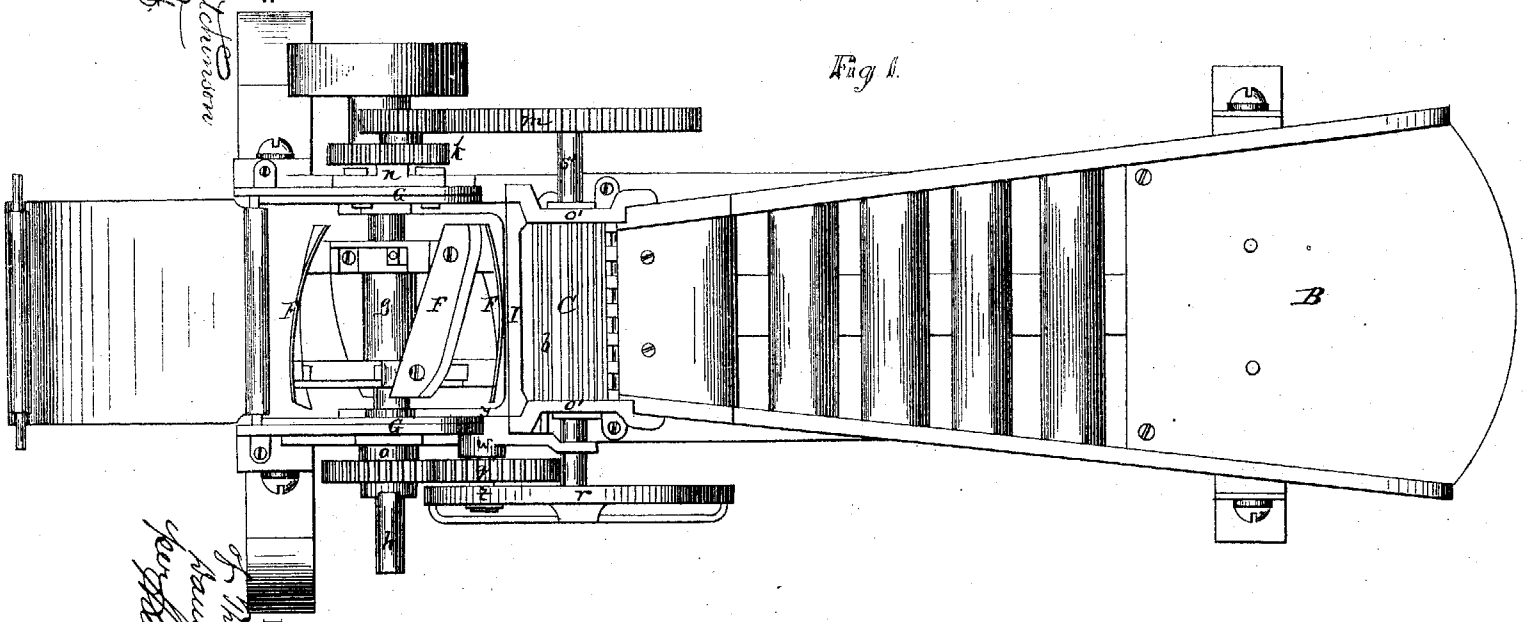
Witnesses:
James E. Hutchinson
Ch. L. Everett
David Fleming
Chas. H. Willson
Executors
Inventor
of Thos. H. Willson.
Daniel T. Willson
per Alexander Mason
Attorneys.
AM. PHOTO-LITHOGRAPHIC CO. N.Y. (OSBORNE'S PROCESS.)

3 Sheets--Sheet 2.
T. H. WILLSON & D. T. WILLSON.
Improvement in Machines for Cutting Hay.
No. 5,049. Reissued Sep. 10, 1872.
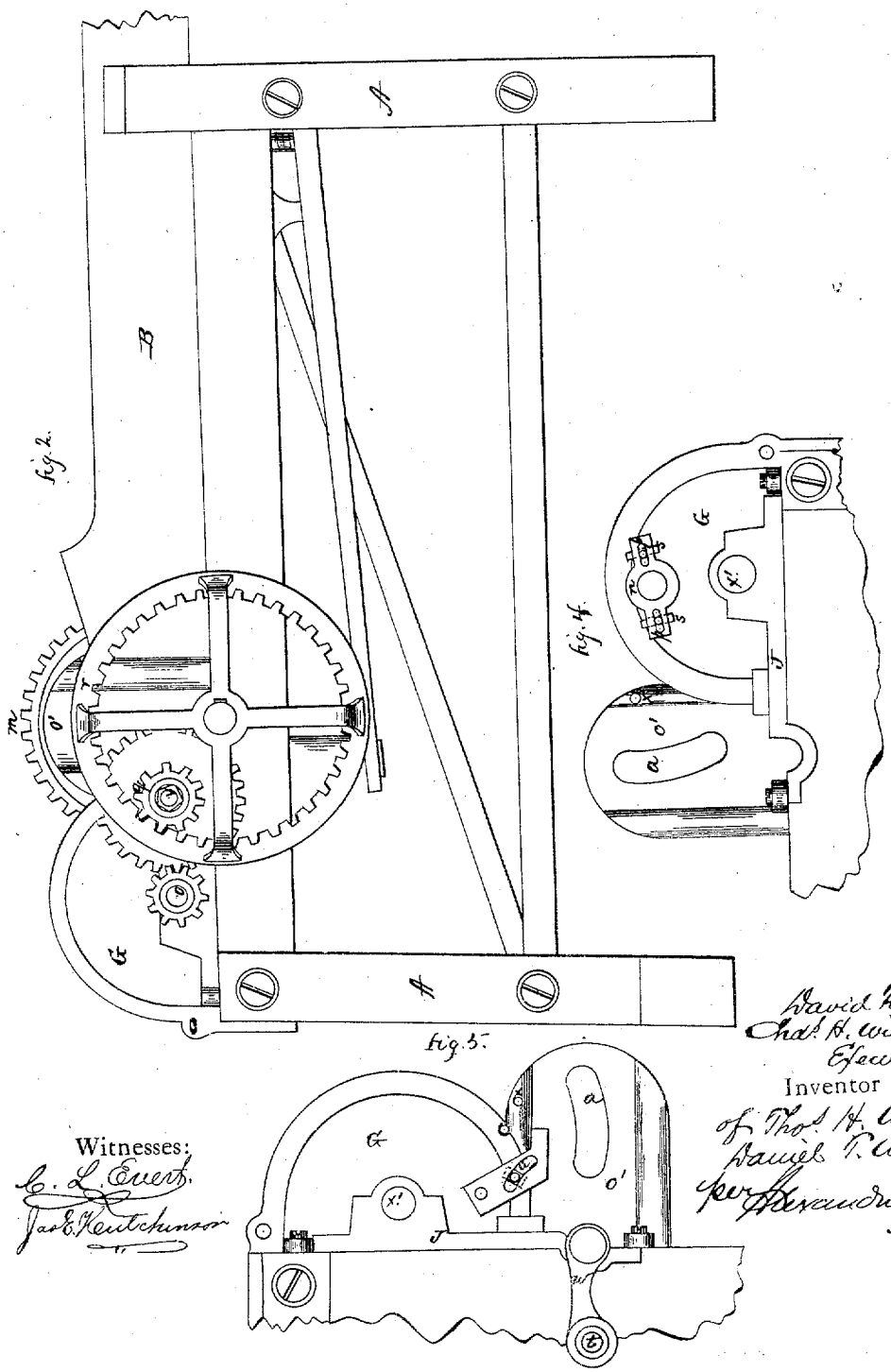
David Fleming
Chas. H. Willson
Executors
Inventor
of Thos. H. Willson.
Daniel T. Willson
per Alexander Mason
Attorneys.
Witnesses:
C. L. Everett.
Jas. E. Hutchinson
AM. PHOTO-LITHOGRAPHIC CO. N.Y. (OSBORNE'S PROCESS.)

3 Sheets--Sheet 3.
T. H. WILLSON & D. T. WILLSON.
Improvement in Machines for Cutting Hay.
No. 5,049. Reissued Sep. 10, 1872.
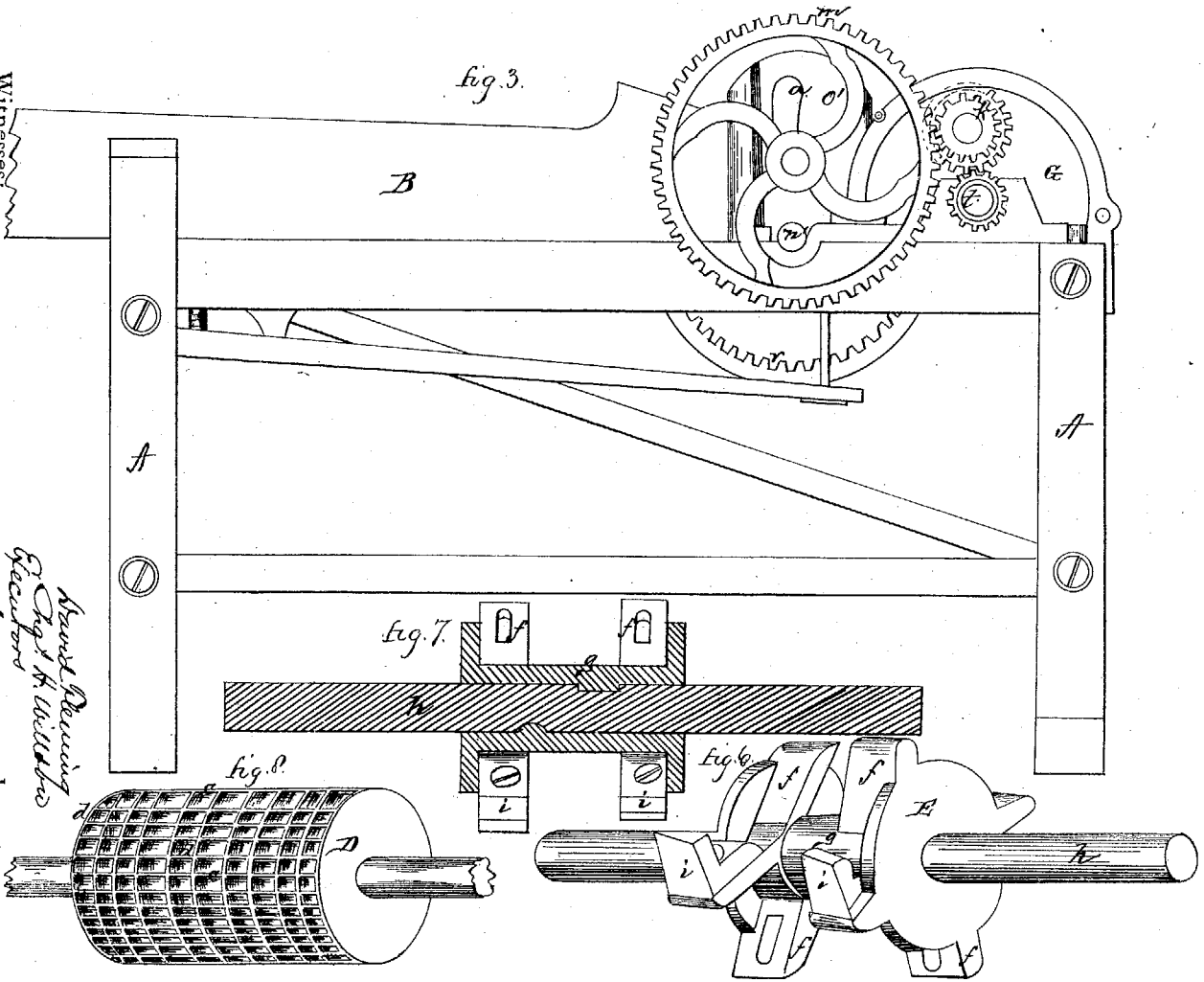
Witnesses:
James E. Hutchinson.
C. L. Ewert.
David Fleming
Chas. H. Willson
Executors
of Thomas H. Willson.
Daniel T. Willson
per Alexander Mason
Attorneys.
Inventor
AM. PHOTO-LITHOGRAPHIC CO. N.Y. (OSBORNE'S PROCESS.)

UNITED STATES PATENT OFFICE.

DAVID FLEMING, OF PHILADELPHIA, AND CHARLES H. WILLSON, OF HARRISBURG, EXECUTORS OF THOMAS H. WILLSON, DECEASED, AND DANIEL T. WILLSON, OF HARRISBURG, PENNSYLVANIA.

IMPROVEMENT IN MACHINES FOR CUTTING HAY.

Specification forming part of Letters Patent No. 30,597, dated November 6, 1860; reissue No. 5,049, dated September 10, 1872.

*To all whom it may concern:*

Be it known that THOMAS H. WILLSON and DANIEL T. WILLSON, of Harrisburg, in the county of Dauphin and State of Pennsylvania, did invent certain new and useful Improvements in Fodder-Cutters, of which the following is a full, clear, and exact description, reference being had to the accompanying drawing forming part of this specification, in which—

Figure 1 represents a plan of a fodder-cutter embracing our improvements. Fig. 2 represents an elevation of one side of the machine. Fig. 3 represents an elevation of the opposite side. Fig. 4 represents an elevation of one side of the frame holding the cutter-head and feed-rollers, with the outer gearing removed. Fig. 5 represents an elevation of the opposite side of the same frame. Fig. 6 represents a perspective of the cutter-head, removed from the machine. Fig. 7 represents a longitudinal section of the same. Fig. 8 represents a perspective view of the lower feed-roller.

It is well known that the slightest variation in the position of the spiral knives on the cutter-head caused by either of the heads turning on the shaft, or by both of them turning at the same time, changes the position of the edge of the knives in relation to the cutter-bar, causing them to strike the cutter-bar or be thrown off from it so that they will not cut the fodder; hence it is very essential in that class of fodder-cutters in which the spiral knife is used, that the two heads holding the knives should be so arranged with relation to each other that the position of the seats of the knives in the opposite heads cannot be varied, as well as the position of the heads on the shafts, and also that the position of the opposite seats for the knife in the two heads should exactly correspond with the angle and curvature of the knife. To effect this is the object of one part of this invention; and the invention for effecting this object consists in casting the arms for supporting the opposite ends of the knives on a wrought-iron shaft, so that the position of the arms in relation to each other, as well as the position of the heads on the shaft, cannot be changed without breaking the heads. And it also consists in combining with this cutter-head adjustable knees, arranged on the same side of the opposite arms, so as to diminish the strain on the holding-bolts, and so that the arms will resist the strain on the knees in the direction of the thrust of the knife, while they support the under face of the knife. The object of another part of this invention is, to prevent the fibrous material on the fodder from being caught by the longitudinal ridges on the lower feed-roller, and forced or carried by them between the back of the cutter-bar and the surface of the feed-roller, causing the cutter-bar to spring outward against the edge of the knives; and the invention for effecting this object consists in combining with the longitudinal ribs transverse ribs, which form a net-work of recesses on the surface of the roller, and prevent the longitudinal ribs from catching the fibrous material and drawing it downward between the feed-roller and back edge of the cutter-bar, while, at the same time, the recesses between the ribs form cups to receive and carry down the loose dirt which collects on the surface of the feed-roller. The object of another part of this invention—applicable to that class of machines in which motion is communicated to all parts by means of gearing—is, to so arrange the gearing and its connections that the machine may be changed to vary the length of cut of the fodder with the greatest facility, and without destroying or affecting the connection of the gears; and the invention for effecting this object consists in slotting the stud-plate carrying the gears transmitting motion from the cutter-head to the yielding feed-roller in one direction, in connection with slotting the side-plate to which the stud is bolted at right angles to the slots in the stud-plate, by which means gears of different sizes may be adjusted with perfect accuracy, to transmit motion from the cutter-head to the upper feed-roller, when required to change the length of cut of the fodder; and also, in connection with the stud-plate, in arranging the axis of the yielding feed-roller to traverse in curved guides, which admit of its rising and falling, and still maintaining the teeth of different-size wheels in gear, so as to transmit motion without binding or getting out of gear when raising or lowering, to suit to varying quantity of feed; and it also consists in arranging the gearing transmitting motion from the cutter-head to the lower feed-roller on a hollow stud attached to a radius-bar, and clamped to the side plate by a bolt passing through a curved slot in the side plate and through the hollow stud, the head of the bolt being on the inside of the plate and the nut on the exterior, by which means the position of the stud may be adjusted for the different-size gears required in varying the feed of the lower roller to change the length of cut of the fodder; and it also consists in combining, with the slotted movable stud-plate, a double pinion, so arranged that by the movement of the stud either one or both pinions are used to make the connection, and thus convert the machine into a double or single geared machine, as required, in cutting the fodder into long or short pieces, and without additional gearing. The object of still another part of this invention, is to maintain the main shaft, which has the cutters—also the cutting-bar and the lower feed-roller—in the same relative positions; and the invention for effecting this object consists in a casting forming a bearing for the main shaft, which has the cutters; also the bearing for the cutting-bar to rest, and the bearing for the lower feed-roller, all cast in one piece, thereby effectually preventing said parts from contracting or separating, which is a great desideratum in cutting-boxes.

In the accompanying drawing is represented a fodder-cutting machine embracing the improvements, which consist of a frame, A, to hold a feeding-trough, B, and support the moving parts; and these parts consist of a yielding upper feed-roller, C, a lower feed-roller, D, and a cutter-head, E, armed with spiral knives F. The shaft *s'* of the upper feed-roller traverses in curved guides *a*, formed in the side plates *o' o'* of the machine, and the surface of the roller is armed with longitudinal ribs *b* to increase its adhesion to the material. The axis *n'* of the lower feed-roller D has its bearings in fixed boxes in the bed-plate, and the surface of the roller is furnished with longitudinal ribs *c*, and transverse ribs *d*, crossing each other, and both at the same level, forming a net-work of cells to receive the dirt accumulating on the surface of the roller and rendering the surface more adhesive than a smooth roller. The cutter-head E consists of radial arms *f* cast on a wrought-iron shaft or axle, *h*, which is roughed, indented, or cut out at several points to prevent the head turning or changing its position on the shaft. The distances between the radial arms or heads correspond with the length of the knives, and the relation the opposite arms bear to each other and to the axis corresponds precisely with the angle of the spiral knife. These arms are provided with adjustable knees *i* to support the under side of the knife, and also so that its distance from the axis of the cutter-head may be adjusted to correspond with the curvature of the face of the knife. These knees are arranged on the front sides of opposite arms, with slots in the arms or knees for bolts, so they can be adjusted to make the knife fit the cutter-bar. It is not claimed that a cutter-head with the knives secured on two adjustable knees, one of said knees arranged on the front of one arm and the other knee on the back of the other arm, is new. The feed-rollers are driven from the cutter-head shaft through a train of gearing, the lower roller being driven from one end of this shaft and the upper roller from the opposite end. A double pinion, *k*, forms the connection between a toothed wheel, *l*, on one end of the cutter-head, and a toothed wheel, *m*, on the end of the upper feed-roller shaft. This pinion turns on a stud, the plate *n* of which has longitudinal slots *p* cut through it, and the side plate G, to which the stud is attached, is also provided with slots at right angles to the slots *p*, so that the bolts by which the stud is attached to the side plate pass through the slots in both plates, and thus admit of the stud being moved upward or outward on the side plate. By thus arranging the stud and side plate the position of the stud may be adjusted for different-size pinions, to connect and transmit motion from the cutter-head to the upper feed-roller. This double pinion *k* is so proportioned that when both wheels of the pinion form the connection, the sliding of the stud-plate and moving the wheel on the shaft of the upper feed-roller serves to form the connection between the cutter-shaft and upper feed-roller with one pinion alone, and thus, without the aid of spare gearing, either a double or single geared connection is made. The shaft of the yielding roller plays in curved guides *a*, the center of whose radius of curvature is above the center of the shaft, and the center of the shaft, when in its normal position, is some distance below the stud carrying the pinions communicating motion to it from the cutter-head, so that different-size pinions may be used on the stud to vary the velocity of the feed-roller and still the feed-roller gear maintain its connection with the intermediate pinion, while at the same time it is free to vibrate in its guides without causing the gearing to bind or become disconnected. Motion is communicated from the opposite end of the cutter-shaft to the lower feed-roller by means of a toothed wheel, *o*, on the cutter-shaft, and an intermediate double pinion, *q*, which gears into an interior-toothed wheel, *r*, fixed to the shaft of the lower feed-roller. This double pinion *q* turns on a hollow stud, *t*, affixed to a radius bar, *w*, which is pivoted to the lower feed-roller shaft. The hollow stud is attached to the side plate G by means of a screw-bolt, *v*, which passes through the stud and through a curved slot, *u*, in the plate. The bolt-head *y* is on the inside of the plate and the tightening-nut on the outside, which allows the stud and the double pinion to be adjusted for different-size toothed wheels on the cutter-head, without interfering with the cutter-head or knives. It will be seen that, in casting the arms for the support of the cutters on a wrought-iron shaft, neither the position of the arms in relation to each other nor their position on the wrought-iron shaft can be changed without breaking the parts. Thus a cheaper, better, and more durable cutter-head is made than heretofore. The transverse ribs on the lower feed-roller prevent the lint or loose fiber of the fodder from winding around and retaining a firm hold on the longitudinal ribs, so as to be carried down by them between their edges and the back of the cutter-bar, causing the cutter-bar to spring outward against the edge of the knives. I represents the stationary cutting-bar, attached by bolts or their equivalent means at *x*, Figs. 4 and 5, and rests upon castings J attached to the side pieces of the machine-frame. These castings extend sufficiently far forward to form bearings *x'* for the main shaft *h*, which has the cutters, and also toward the rear to form bearings for the lower feed-roller. The side plates G *o'* are so constructed and arranged on the machine that they rest upon the castings which form the three bearings, as described, and are bolted on the frame in front of bearing-casting, while their rear ends are provided with short ears at their bottoms, through which are passed bolts directly through the rear of the casting and to the frame of the cutter. By thus forming the bearing for the main shaft, the rest for the stationary cutting-bar, and the bearing for the lower feed-roller all in one piece, these parts are always maintained in the same relative position, and all contraction or separation of said parts is effectually prevented.

Having thus described our improvement in fodder-cutters, what we claim therein as new, and desire to secure by Letters Patent, is—

1. A cutter-head composed of radial cast-iron arms cast upon a wrought-iron axle, for the purposes set forth.

2. One or more sets of radial arms secured to an axle and provided with adjustable knees secured to the front face of the arms, substantially as set forth.

3. The lower feed-roller, provided with transverse and longitudinal ribs upon its surface, for the purpose set forth.

4. The slotted plate *n*, carrying the stud for the intermediate pinion connected to the slotted side plate G by bolts, the slots in the plate *n* and the plate G being at right angles to each other to allow both a vertical and horizontal movement, substantially as and for the purposes herein set forth.

5. The guides of the feed-roller shaft, provided with a curved slot, as described, in connection with the stud-plate, arranged as described.

6. The intermediate double pinion *q*, arranged on an adjustable stud and supporting said stud by means of a radius-bar, *w*, pivoted to the shaft of the feed-roller, substantially as herein described, for the purpose set forth.

7. The combination of the slotted stud-plate with the double pinion, arranged as described, for the purpose set forth.

8. The combination of the casting J, which forms a bearing for the main shaft, the rest for the stationary cutting-bar, and the bearing for the lower feed-roller, with the side plate G *o'*, all constructed and arranged substantially as set forth.

In testimony that we claim the foregoing we have hereunto set our hands.

D. FLEMING,
C. H. WILLSON,
*Executors of* T. H. WILLSON.
D. T. WILLSON.

Witnesses as to D. FLEMING and D. T. WILLSON:
SAML. J. M. MCCARRELL,
A. FLEMING, Jr.
Witnesses for C. H. WILLSON:
ROBT. T. BORCKMAN,
L. D. WILLSON.